(12) United States Patent
Moncomble

(10) Patent No.: US 10,701,209 B2
(45) Date of Patent: Jun. 30, 2020

(54) METHOD AND DEVICE FOR MANAGING SPEAKING TURNS FROM A MOBILE TERMINAL

(71) Applicant: ORANGE, Paris (FR)

(72) Inventor: Ghislain Moncomble, Plestin les Greves (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/774,816

(22) PCT Filed: Oct. 26, 2016

(86) PCT No.: PCT/FR2016/052786
§ 371 (c)(1),
(2) Date: May 9, 2018

(87) PCT Pub. No.: WO2017/081385
PCT Pub. Date: May 18, 2017

(65) Prior Publication Data
US 2018/0359366 A1 Dec. 13, 2018

(30) Foreign Application Priority Data
Nov. 9, 2015 (FR) .................................. 15 60719

(51) Int. Cl.
*H04M 3/42* (2006.01)
*H04M 3/56* (2006.01)
(Continued)

(52) U.S. Cl.
CPC ........ *H04M 3/566* (2013.01); *H04L 12/1813* (2013.01); *H04L 12/1822* (2013.01);
(Continued)

(58) Field of Classification Search
CPC ....... H04M 3/566; H04M 3/568; H04W 4/16; H04W 64/006
(Continued)

(56) References Cited

U.S. PATENT DOCUMENTS 6,105,054 A * 8/2000 Kawashima ........ H04L 12/1818
348/E7.082
8,600,027 B1 * 12/2013 Doerr .................... H04M 3/565
379/202.01
(Continued)

FOREIGN PATENT DOCUMENTS

EP 1638249 A1 3/2006

OTHER PUBLICATIONS

International Search Report dated Feb. 1, 2017 for corresponding International Application No. PCT/FR2016/052786, filed Oct. 26, 2016.
(Continued)

*Primary Examiner* — Khoi H Tran
*Assistant Examiner* — B M M Hannan
(74) *Attorney, Agent, or Firm* — David D. Brush; Westman, Champlin & Koehler, P.A.

(57) ABSTRACT

A method for managing speaking turns, between a first mobile terminal and a second terminal, the first and second terminals being included in a set of interconnected terminals via a first communication network. The method including, following reception and validation on the second terminal of a connection request sent by the first terminal, the acts of configuring, for each of the terminals of the assembly apart from the first and second terminals, a first communication restriction for the connections using the first communication network and, establishing a communication between the first and the second terminal. On detecting the end of the
(Continued)

Figure 1:
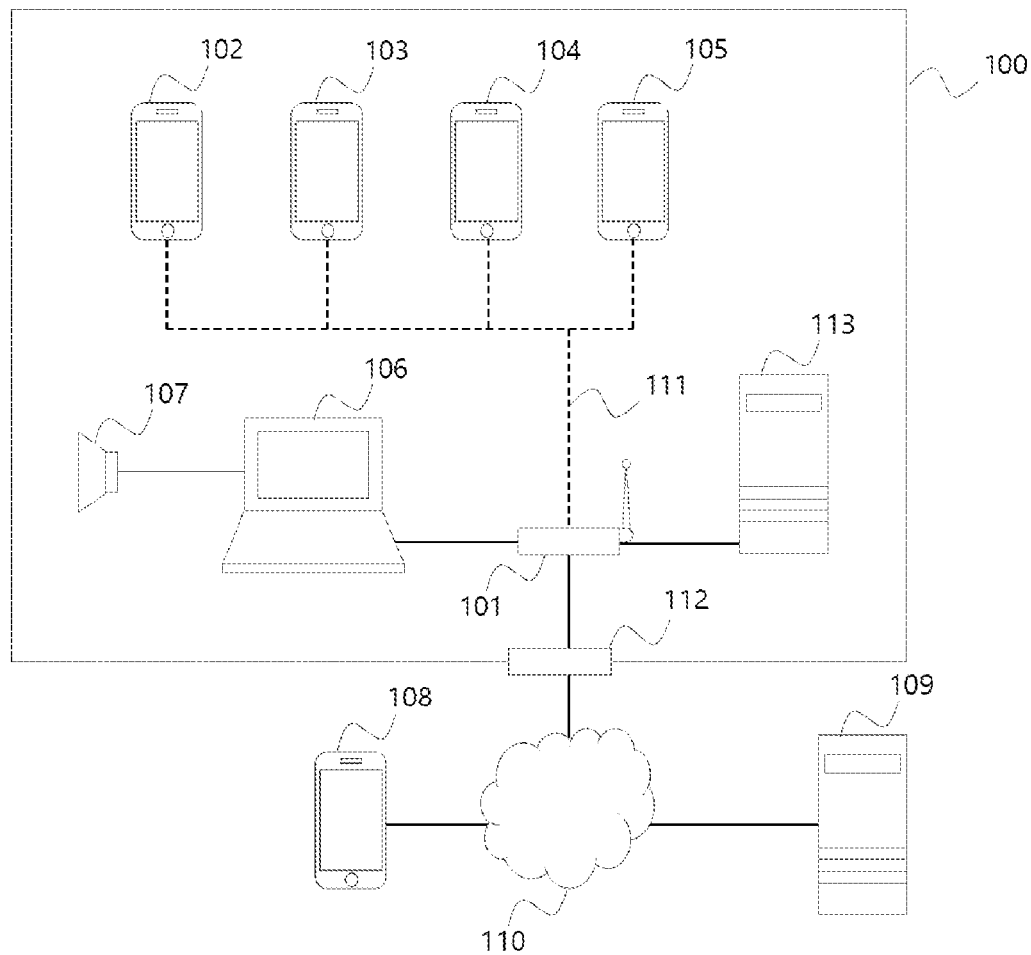

communication, the method further includes removing the communication restriction for the set of terminals.

11 Claims, 4 Drawing Sheets

(51) Int. Cl.
    *H04L 12/18*     (2006.01)
    *H04L 29/06*     (2006.01)
    *H04W 4/16*     (2009.01)
    *H04W 64/00*     (2009.01)

(52) U.S. Cl.
    CPC ...... *H04L 12/1827* (2013.01); *H04L 65/1069* (2013.01); *H04L 65/1089* (2013.01); *H04L 65/403* (2013.01); *H04L 65/4038* (2013.01); *H04M 3/568* (2013.01); *H04W 4/16* (2013.01); *H04W 64/006* (2013.01)

(58) Field of Classification Search
    USPC .......................................................... 455/416
    See application file for complete search history.

(56) References Cited

U.S. PATENT DOCUMENTS

| | | | |
|---|---|---|---|
| 2002/0156932 A1* | 10/2002 | Schneiderman | G06F 9/4862 719/317 |
| 2004/0249967 A1* | 12/2004 | Swanson | G06Q 10/10 709/231 |
| 2006/0019692 A1* | 1/2006 | Huh | H04W 4/10 455/518 |
| 2006/0154654 A1* | 7/2006 | Jabbour | H04M 3/428 455/417 |
| 2006/0177034 A1* | 8/2006 | Reding | H04M 3/46 379/211.02 |
| 2008/0010347 A1* | 1/2008 | Houghton | H04L 29/06027 709/205 |
| 2010/0124321 A1* | 5/2010 | Alexandrov | H04M 3/56 379/202.01 |
| 2012/0268553 A1 | 10/2012 | Talukder | |
| 2015/0024725 A1* | 1/2015 | Lang | H04M 1/72572 455/417 |
| 2015/0078295 A1 | 3/2015 | Mandyam et al. | |
| 2015/0079959 A1 | 3/2015 | Daudelin et al. | |
| 2016/0065894 A1* | 3/2016 | Lin | H04N 7/15 348/14.07 |

OTHER PUBLICATIONS

English translation of the International Written Opinion dated Feb. 1, 2017 for corresponding International Application No. PCT/FR2016/052786, filed Oct. 26, 2016.

* cited by examiner

METHOD AND DEVICE FOR MANAGING SPEAKING TURNS FROM A MOBILE TERMINAL

CROSS-REFERENCE TO RELATED APPLICATIONS

This Application is a Section 371 National Stage Application of International Application No. PCT/FR2016/052786, filed Oct. 26, 2016, which is incorporated by reference in its entirety and published as WO 2017/081385 A1 on May 18, 2017, not in English.

TECHNICAL FIELD

The present invention pertains to the field of telecommunications, and relates more particularly to a method for speaking in a meeting from a personal mobile terminal.

PRIOR ART

During a conference or any meeting in which a group of participants takes part, it is common to give the floor to members of the audience so that they are able to react and ask questions in relation to what has been presented. Traditionally, a participant wishing to speak makes himself known by raising his hand and a wireless microphone is brought to him. At the end of his contribution, the participant returns the microphone, which is able to be brought to another participant. Such a microphone is generally linked to a sound system of the conference room, such that the meeting is able to benefit from the contribution.

This mode of operation exhibits drawbacks. In particular, the time to pass the microphone around to a participant who wishes to speak results in wasted time. Moreover, this system poses problems in terms of logistics, as the microphones have to be kept in an operative state and in sufficient numbers.

Patent application US 2015/0079959 A1 proposes an alternative that is beneficial to this mode of operation. This document describes a method allowing members of the audience to request to speak and to speak by way of their personal mobile terminal, such as for example from a smartphone. To this end, the method according to this application allows an individual to indicate his intention to speak by way of a dedicated interface that is accessible from his terminal. This is for example a website that is accessible from the smartphone and to which the user signs up with his telephone number. When a user indicates his intention to speak, a message is displayed on a console of the conference leader (for example a computer). Said conference leader is thus able to view the various requests to speak and trigger a voice call to the terminal that made one or the other of these requests. When the communication is established, the voice communication is redirected to the sound system of the room. The individuals in the meeting are thus able to speak without it being necessary to pass around microphones. The method according to this application furthermore has the advantage of allowing individuals following the conference remotely, for example by way of retransmission on a website, to ask to make a contribution and to speak remotely.

In spite of the undeniable advantages of the method described in application US 2015/0079959 A1, the latter exhibits drawbacks for which no satisfactory solution is provided.

In particular, the use of telephone numbers is not suitable. Specifically, during international conferences, the meeting is often made up of citizens from various states. Establishing telephone communications in order to speak may then bring about significant telephone charges, both for the organizers of the conference and for the participants. To circumvent this drawback, the idea is naturally arrived at to implement a system of communication based on voice over IP (Internet Protocol) technologies. Thus, a communication system accessible by way of a WiFi access point makes it possible for example to implement the method discussed above without it being necessary to establish telephone communication. It is thus possible to reduce the charges both for the organizers of the conference and for the participants speaking.

However, this particular implementation gives rise to other drawbacks.

In particular, in order to access a communication over IP service for free, the participants have to configure their terminal so as to use the WiFi access point of the conference room. Using this access point, the users are able to access the Internet, log on to the website associated with the conference, request to speak and speak by way of a voice over IP application, for example. Thus, the WiFi access point of the conference room may be used by the audience to access various documents online but also to speak. In some cases, depending on the number of participants, these various instances of accessing the Internet may generate congestion and impair the audio quality of the speech.

Using a personal mobile terminal to speak in a conference according to this prior art exhibits other drawbacks.

For example, when a user wishes to speak, he indicates his intention by sending a request to speak, which is displayed on a terminal of the conference leader. Now, a certain time may elapse between the moment when the request to speak is received and the moment when the participant is actually able to speak. For example, other participants may contribute before him, or else the conference leader may wish to finish his presentation before accepting the contribution. Thus, at the moment when the participant is actually able to speak, the subject of the contribution may no longer be relevant to the presentation.

Moreover, when a traditional wireless microphone is used, it is easy to follow the path of the microphone in the meeting to determine the individual who is speaking. By contrast, when a participant is speaking from his personal mobile terminal, it is more difficult to locate him in the meeting.

There is therefore a need for a solution for managing speaking when speaking in a meeting from a personal terminal, which solution makes it possible to facilitate and to guarantee the quality of such contributions.

SUMMARY OF THE INVENTION

To this end, the invention relates to a method for managing speaking, between a first mobile terminal and a second terminal, the first and second terminals being included in a set of terminals that are interconnected through a first communication network.

The method is noteworthy in that it includes, following the receipt and the validation, on the second terminal, of a connection request transmitted by the first terminal, steps of:

Configuring, for each of the terminals of the set except for the first and second terminals, a first communication restriction for the connections using the first communication network, and Establishing communication between the first and the second terminal.

Upon detection of the end of the communication, the method furthermore includes a step of removing the communication restriction for all of the terminals.

The general principle of the invention is based on the insertion, into a local area network, of a control system designed to limit access to online services for certain terminals that are connected to the local area network, and to give precedence to a particular mobile terminal. 'Communication restriction' is understood to mean a limit imposed on a terminal when it accesses online services. This may be for example a bit rate limit, a blocking of access, a redirection to an alternative service or else, for example, a timing out of access. The restriction may be associated with the use of one or more particular services or networks.

'Connection request' is understood to mean a message sent by a terminal when its user wishes to speak during a conference, for example. Such a message in the present invention performs the role of a raised hand in a traditional meeting.

The invention may be implemented in a conference room or auditorium, or more generally a location suitable for holding a meeting, in which participants are able to speak and contribute by way of their mobile terminal. The invention applies in particular when speaking is performed from a mobile terminal designed to communicate in accordance with a voice over IP (VoIP) protocol through a local area communication network of the room.

Thus, when a participant speaks, VoIP communication is established over a local area network of the room, between the terminal of the participant and a terminal of the conference leader that is linked to the sound system of the room.

When this same wireless network is being used simultaneously by other participants in the conference to access online services, the quality of the VoIP communication may be heavily impaired by congestion and other disruption of the network traffic.

By virtue of the invention, when a participant requests to speak, a bit rate limit is imposed on the other terminals in the meeting with regard to them accessing online services. Thus, when the communication is established between the terminal of the participant and the terminal of the conference leader, it is possible to guarantee a minimum bit rate for the communication. The quality of the communication is thus guaranteed. The bit rate limit imposed on the terminals may for example be calculated depending on the bandwidth necessary to establish communication between the terminal used to speak and the terminal of the conference leader, or depending on whether or not the requested communication uses audio and/or video media.

At the end of the communication, the communication restriction is lifted.

According to one particular implementation, the method is such that it furthermore includes a step of configuring, for each of the terminals of the set except for the first and second terminals, a second communication restriction that is applied to the connections established to services that are available on a second network that is accessible via an access appliance connected to the first network.

It is often the case that the first network, which makes it possible to interconnect the terminals, for example the local area network of an auditorium, offers the option of accessing a second network by way of a gateway, such as an ADSL modem, for example. These two networks generally have different technical features. The gateway may furthermore form a bottleneck. In order to prevent congestion at the gateway and to guarantee a good quality of service during a contribution, while at the same time allowing access to resources on the local area network, the invention proposes to impose a different communication restriction for accessing the first and the second communication network.

Thus, the method according to the invention makes it possible to set for example a first maximum bit rate for connections to services that are available on the first network, and a second maximum bit rate for accessing services that are available on the second network.

According to one particular embodiment, the method is such that it furthermore includes, upon receipt of a connection request originating from the first terminal, a step of associating the request with an element displayed on a presentation device.

When a connection request is received by the terminal of the conference leader, said request may be connected to a document projected onto a screen of the room. For example, upon receipt of such a request, the method may store context information relating to the presentation of the conference leader, such as a document and a page currently being displayed on a video projector. It is thus possible to automatically display, on the screen of the conference leader, the request to speak in connection with the probable subject of this speech or a question that is asked.

According to one particular embodiment, the method is such that the connection request contains at least one item of data on the location of the first terminal.

The connection request may thus contain an item of information on the location of the participant, so as to allow the conference leader to easily locate a participant in the room when said conference leader grants said participant time to speak. The item of location information may correspond for example to a seat number in a room, an item of information on a geographical location inside a building, or else a geographical position of GPS coordinate type when the participant is not present in the room and is following the conference from his home, for example. When the request is transmitted by a participant present in the room, this item of location information may be used for example to direct a spotlight or a camera to this participant.

According to one particular embodiment, the method is such that the connection request contains at least one reason for the request.

The connection request contains the reason for the contribution. For example, a user may enter the text of a question that he wishes to ask, or select a subject on a screen of his terminal. Upon receipt of such a connection request, the terminal of the conference leader may display the request and the reason for the request. This provision allows the conference leader to ascertain the content of the contribution before giving the floor, so as for example to avoid the same question being asked several times.

According to one particular implementation, the method is such that it furthermore includes, upon receipt of a connection request, a step of transmitting an acknowledgement of receipt containing at least one order number corresponding to a position of the request in a queue of received requests.

When a plurality of connection requests are received, they are put in a queue. The position in the queue is then communicated to the participant so as to inform him of the period that may elapse before the floor is given to him. The order number may also be determined according to subject-based organization of the received connection requests, so as to group together the contributions that are linked to one another.

According to another aspect, the invention relates to a device for managing speaking, between a first mobile terminal and a second terminal, the first and second terminals being included in a set of terminals that are interconnected through a first communication network, the device being notable in that it comprises:

A communication interface designed to receive and validate a request to validate a connection request transmitted by the first terminal, A configuration unit designed to configure, for each of the terminals except for the first and second terminals, a first communication restriction that is applied to the connections using the first communication network, A call management unit, designed to establish communication between the first and the second terminal, and to detect the end of communication, and The configuration unit furthermore being designed to remove the communication restriction for all of the terminals.

According to one particular implementation, the management device is such that the configuration unit is furthermore designed to configure, for each of the terminals except for the first and second terminals, a second bit rate limit that is applied to the connections established to services that are available on a second network that is accessible via an access appliance connected to the first network.

According to one particular embodiment, the management device is such that it furthermore includes:

A processor configured to associate a received connection request with an element displayed on a presentation device, A memory for storing the association.

The invention also relates to a server for managing speaking, such that it includes a management device such as described above.

The invention also relates to a terminal for managing speaking, characterized in that it includes a device such as described above.

The devices, servers and terminals have advantages analogous to those of the method presented above.

In one particular embodiment, the various steps of the method according to the invention are determined by computer program instructions.

As a result, the invention also targets a computer program including instructions designed to implement the steps of a method such as described above when the program is executed by a processor.

This program may use any programming language, and be in the form of source code, object code, or of intermediate code between source code and object code, such as in a partially compiled form, or in any other desirable form.

The invention also targets a computer-readable recording carrier on which a computer program comprising instructions for the execution of the steps of the method is stored.

The information carrier may be any entity or device capable of storing the program. For example, the carrier may include a storage means, such as a ROM, for example a CD-ROM or a microelectronic circuit ROM, a flash memory, or else a magnetic recording means, for example a floppy disk or a hard disk.

Moreover, the information carrier may be a transmissible carrier such as an electrical or optical signal, which may be routed via an electrical or optical cable, by radio or by other means. The program according to the invention may in particular be downloaded from an Internet network.

As an alternative, the information carrier may be an integrated circuit in which the program is incorporated, the circuit being designed to execute or to be used in the execution of the method in question.

LIST OF THE FIGURES

Figure 2:
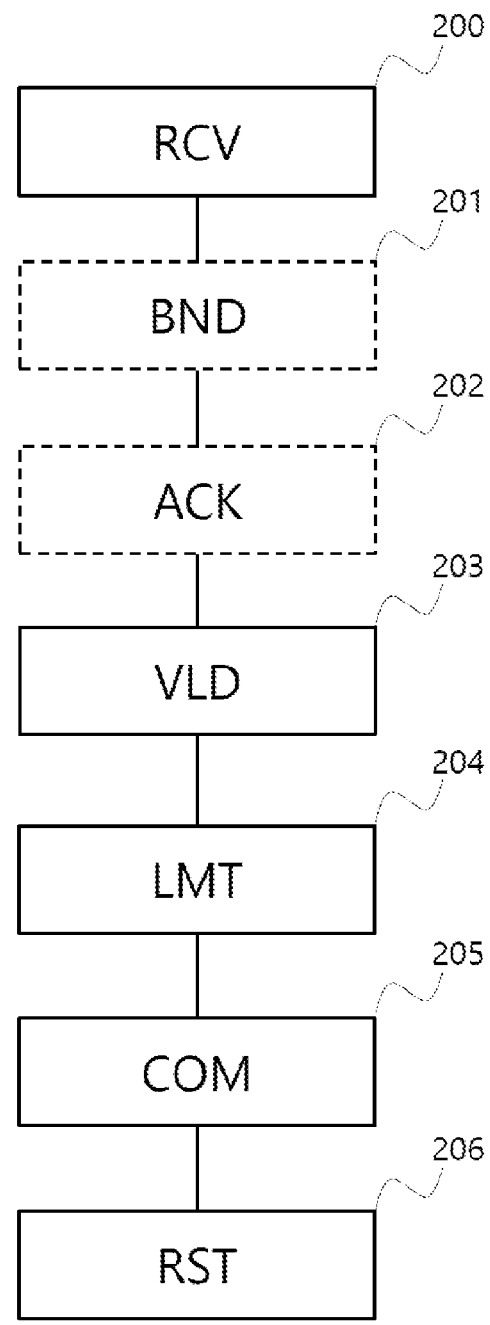
Figure 3:
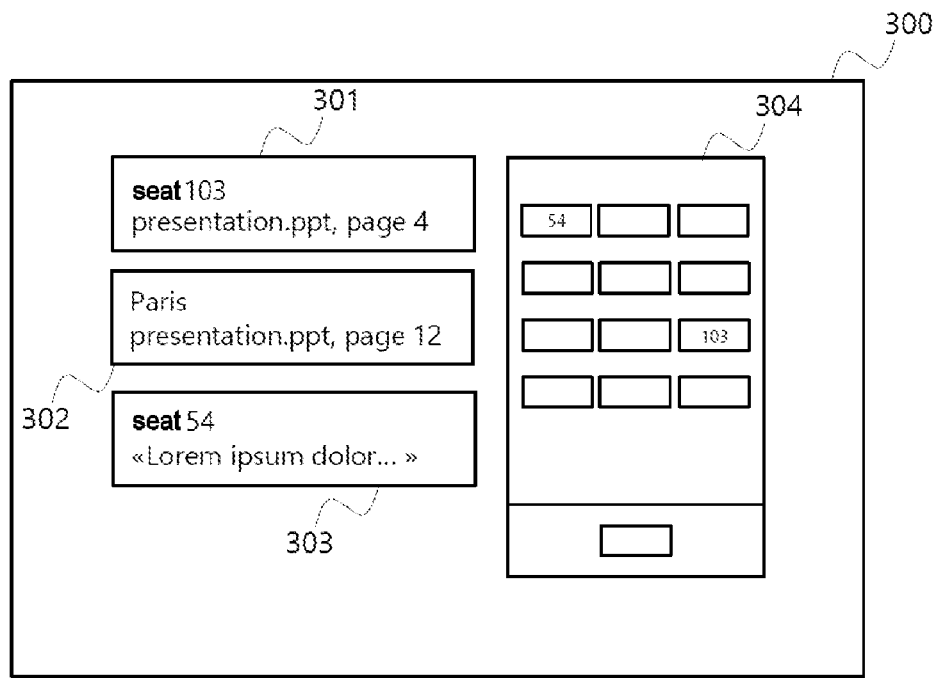
Figure 4:
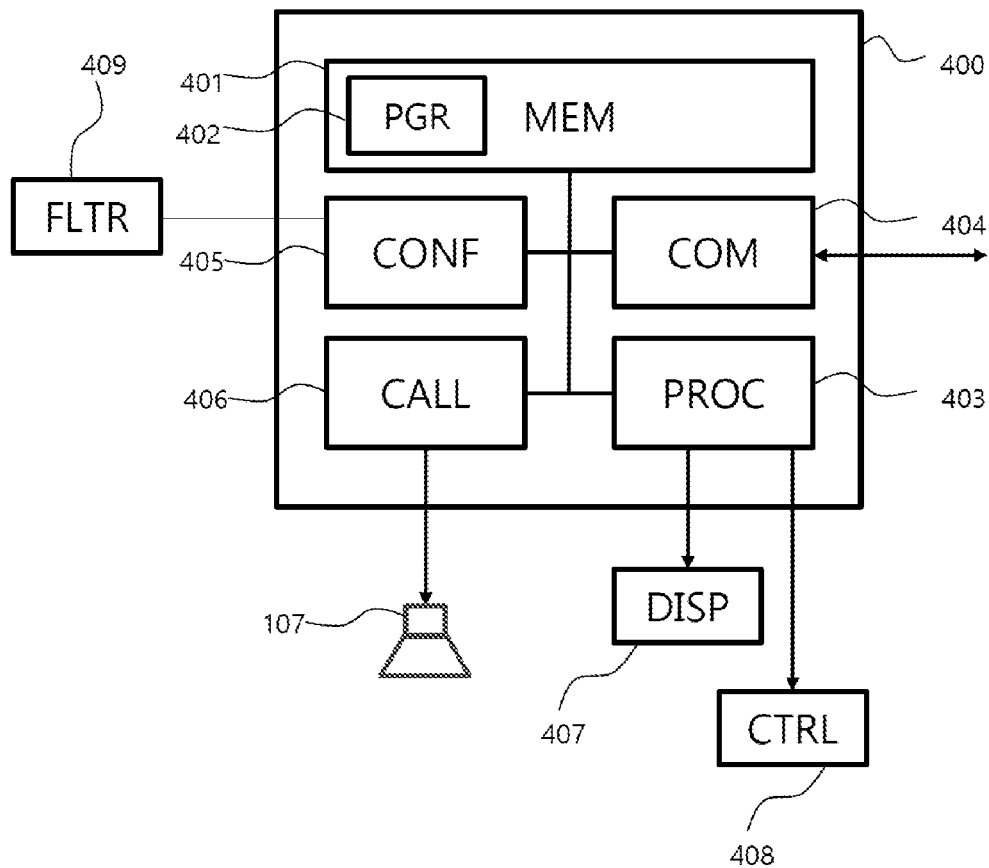

Other features and advantages will become apparent on reading preferred embodiments that are described with reference to the figures, in which:

FIG. 1 illustrates an architecture suitable for implementing the invention, according to one particular embodiment, FIG. 2 illustrates the main steps of the management method according to one particular implementation of the invention, FIG. 3 illustrates an example of the displaying of received connection requests, according to one particular embodiment of the invention, FIG. 4 shows the architecture of a device according to one particular embodiment of the invention.

DETAILED DESCRIPTION

FIG. 1 illustrates an architecture suitable for implementing the invention. The figure shows a communication network 100 installed in a conference room, for example. The communication network is an Ethernet local area network, for example. The local area network 100 comprises an access point 101 by way of which a plurality of terminals, denoted 102 to 106, are able to connect to the network and communicate with various services that are available on this network. The access point 101 is preferably a wireless access point, for example a WiFi access point, and allows the terminals to access a server 113 that is also connected to the network. Thus, the terminals 102 to 106 are able to exchange data with one another and download data from the server 113. In this example, the terminals 102 to 105 are smartphones belonging to individuals participating in a conference, and are connected to the network 100 by way of a wireless connection 111, for example of WiFi type. The terminal 106 corresponds to a computer that is available to the conference leader. This computer is preferably connected to a sound system 107 of the room. It is for example a computer integrated into a desk, allowing a conference leader to present documents on a screen and to broadcast audio documents via the sound system of the room. The terminals 102 to 106 shown in this example are furthermore designed to establish voice communications, using the local area network 100, in accordance with a voice over IP (VoIP) protocol, such as SIP, H.323 or else MGCP. Thus, voice communication is able to be established between a terminal of a participant, for example the terminal 103, and the computer of the conference leader 106. With the computer of the conference leader being linked to the sound system 107, the speech uttered by the user of the terminal 103 is then able to be played back in the room. Such a system may be used to give the floor to a participant during a conference.

Of course, FIG. 1 and the present example are given purely by way of indication, and do not constitute the only possible implementation of the invention. For example, there may be more or fewer terminals, and the terminals may be of different types or else use different communication protocols. For example, the terminals may be smartphones, tablets, laptop computers or any other device suitable for establishing voice communications over a local area network. This example is described in relation to voice communication, but the invention applies in the same way to audiovisual communication.

FIG. 1 furthermore shows an access appliance 112, allowing the terminals of the local area network 100 to access services that are available on a second network 110, such as for example the Internet. The access appliance may correspond for example to an ADSL (Asymmetric Digital Subscriber Line) modem, a router or any other appliance allowing the terminals to access the second network. The terminals 102 to 106 may thus for example access the server 109 through the local area network 100 and the Internet 110.

FIG. 1 also shows a terminal 108 connected to the Internet 110. This terminal may be a personal computer, a smartphone or else a tablet belonging to a user taking part in the conference remotely, when said conference is retransmitted in real time on an Internet site, for example. The terminal 108 is designed to establish, with the computer 106, VoIP communications using the networks 110 and 100. A user taking part in the conference remotely is thus able to contribute in the same way as the individuals who are physically present in the room.

When the terminals 102 to 106 access services provided by the servers 113 and 109, they generate traffic on the network 100. In particular, this traffic may cause congestion at the appliances 101 and 112. Such congestion may be detrimental to the quality of the communications that are established between the terminals 102 to 105 and 108, and the computer 106 of the conference leader. One of the aims of the invention is to prevent such impairment of the quality of the communications.

FIG. 2 illustrates, in the form of a diagram, the main steps of the method for managing the quality of communication according to one particular embodiment of the invention. In this embodiment, the invention is implemented by the computer 106 of FIG. 1. However, the invention may also be implemented by another appliance of the network, such as for example by the access point 101 or another server connected to the network.

During a first step 200, a connection request is received. This connection request is transmitted by a terminal of the audience, for example by the terminal 103. The transmission of such a request by the terminal 103 is triggered following an action from the user of the terminal when said user wishes to speak. For example, when the user of the terminal 103 wishes to react or ask a question following remarks from the conference leader, said user is able to press a button provided for this purpose on an interface of the terminal 103, the action on this button bringing about the transmission of a connection request to the computer 106 that is implementing the invention. According to one particular embodiment, such a connection request is made by transmitting a signaling message including at least one identifier of the terminal. This identifier may be used by the terminal 106 to establish voice or audiovisual communication. According to one particular implementation, this signaling message furthermore includes a reason for the connection. For example, the message may contain a field including text entered by the user, the text outlining the purpose of the connection request. According to another particular embodiment, the reason, as transported in the signaling message, may be an index referring to a list of reasons that is known both to the terminal 103 and to the terminal 106. According to one particular embodiment, the connection request message is a SIP (Session Initiation Protocol) INFO or OPTIONS message, or else an HTTP request. According to one particular embodiment, the connection request includes a call identifier of the terminal that transmitted the request. This call identifier makes it possible to establish voice or audiovisual communication with the terminal when the connection request is accepted. According to one particular implementation of the invention, the connection request message contains at least one item of location data. This item of location data may correspond for example to a seat number in a conference room, or else to GPS (Global Positioning System) coordinates of the terminal. Such GPS coordinates may be obtained by the terminal when it is equipped with a GPS module. When the indication corresponds to a seat number in a room, said seat number may be entered by the user of the terminal through an interface provided for this purpose on the terminal, or else obtained by way of a scanned code, such as for example a QR code or an RFID (Radiofrequency Identification) device associated with the location of the user in the room. Such an item of information on a location in the room may also be obtained by way of a lighting device using VLC (Visible Light Communication) technology, such as for example a LiFi (Light Fidelity) lighting system.

According to one particular embodiment, a connection request received in step 200 is able to be matched with an element displayed on a presentation device during a step 201. For example, when a connection request is received while a document is being projected onto a screen by virtue of a video projector, the method according to the invention makes it possible to associate the content displayed with the connection request and to store this association. In this way, the context of the request is stored, and the conference leader is able to know to what part of a presentation a question that a participant wishes to ask relates. To this end, a device implementing the method according to the invention, such as for example the terminal 106, is able to establish a connection with an item of software or a device used to present the document, in order to obtain an identifier of the document that is displayed. The identifier of the document corresponds for example to the title of the document or to a file name, possibly supplemented by a title or by a page being displayed at the moment when the connection request is received. The connection established with the item of software or the presentation device may be a local connection, made by way of an API (Application Programming Interface), or a remote connection, by way of a suitable network protocol, for example a protocol of http type.

At this stage, the received connection requests may be displayed in the form of a list on a screen of the terminal 106. FIG. 3 illustrates an example of the displaying 300 of received connection requests 301, 302 and 303, according to one particular embodiment of the invention. For example, a connection request may be shown by the frame 301 on a screen of the computer 106. Such a depiction contains in particular a seat number corresponding to the location, in the room, of the individual that asked to make a contribution, the name of the file and the page displayed on a presentation device at the moment when the request is received. FIG. 3 also illustrates a map of the room 304. Such a map makes it possible to match an item of location data present in the connection request with a location in the room. In this way, a conference leader is easily able to locate, in the room, an individual to whom he gives the floor. Such a map may be known to the terminal by virtue of a prior configuration, and make it possible to direct a spotlight or a camera.

The method according to the invention may furthermore include, in one particular implementation, a step 202 of sending an acknowledgement of receipt of the connection request. Such an acknowledgement of receipt may in particular contain an order number corresponding to a rank in the list of received connection requests. In this way, a participant in the conference is able to know the number of individuals who will speak before him. Such an item of information may be transmitted in a response to the connection request message. For example, when the connection request is transmitted by way of a SIP OPTIONS message or of an HTTP request, this item of information is transmitted in the 200 OK response to this message or this request.

According to one particular implementation, upon receipt of a connection request, an indication according to which a connection request has been received, possibly accompanied by a reason, is transmitted to at least one other terminal in the meeting. The participants in the conference are thus informed of the questions that will be asked. The method thus makes it possible to avoid users making connection requests in order to contribute for the same reason or ask the same question. According to one particular implementation, the received requests to speak are grouped together by subject, using for example key words in the reason so as to determine a running order for the contributions.

In step 203, the connection request is validated by the user of the terminal 106. For example, the conference leader may validate the connection request when he wishes to give the floor to an individual who has requested to speak. To this end, the conference leader may select a request by way of a user interface displayed on a screen of the terminal 106, for example through an interface such as the one described with reference to FIG. 3.

In order to guarantee the quality of such a contribution, the method implements, in step 204, a limit of the bit rate available for each of the other terminals present in the room. To this end, the computer 106 configures, for each of the terminals, except for the terminals used for the connection, that is to say for the terminals 103 and 106 in this example, a communication restriction for the connections using the local area network of the conference room. Such a configuration may be achieved in various ways. For example, according to a first particular embodiment, the appliance implementing the method transmits a message to a router appliance designed to apply rules for controlling traffic on the network, such as for example the access point 101. This router appliance is preferably configured as a default gateway on the terminals of the audience. The default gateway may be defined on the terminals when the IP address of the terminal is assigned by a DHCP (Dynamic Host Configuration Protocol) service of the local area network. The configuration message includes, for a terminal, at least one identifier of the terminal, such as for example an IP (Internet Protocol) address, a MAC (Media Access Control) address, a call identifier or any other suitable identifier. The configuration message may furthermore include a restriction parameter corresponding for example to a maximum authorized bit rate for accessing a network or a given service. The connections of the terminals identified in the configuration message will thus be limited in terms of bit rate when they access a service or a particular network. In this way, the method makes it possible to guarantee the availability of the resources that are necessary for the communication when the participant makes a contribution. For example, when communication is established between the terminal 103 and the computer 106, the bit rate of the other terminals 102, 104 and 105 is limited by the router appliance 101 when said other terminals access the server 113.

According to another implementation, the restriction is configured by a configuration message that is sent to the terminals. Such a message contains for example a maximum authorized bit rate for the connections to a service or a particular network. The terminals are then responsible for applying the restriction.

According to one particular embodiment, the communication restriction configured for a terminal depends on the network to which the terminal establishes connections. For example, the method proposes to configure, for each of the terminals except for the terminals 103 and 106 between which communication is established, a second communication restriction that is applied to the connections, originating from these terminals, to services available on a second network, such as for example to the Internet 110, accessible via the access appliance 112 connected to the local area network 100. Thus, the restriction that is imposed is not the same depending on whether a terminal accesses a service offered by the server 113 or a service offered by the server 109. This provision makes it possible to adapt the restriction to the capacities of the networks that are solicited. In particular, it has the advantage of guaranteeing, to the terminal 108 located outside of the conference room, the availability of the necessary resources at the access point 112 to connect to the computer 106.

According to one particular embodiment, the method according to the invention proposes to transmit, to the terminal corresponding to the validated connection request, a message that makes it possible to obtain the communication capabilities of the terminal. For example, a SIP OPTIONS message may be sent so as to receive, in response, all of the audio and/or video codecs that are supported by the terminal, and also the various encoding profiles that are supported. The difference between the maximum bit rate offered by the local area network and the maximum bit rate liable to be used by the terminal during communication makes it possible to determine the bit rate available for the other terminals when the terminal is communicating. Thus, by dividing for example this available bit rate by the number of terminals present in the room, it is possible to determine the bit rate limit to be imposed on each of the terminals.

According to one particular implementation of the invention, during step 205, a message to establish a call in accordance with a voice over IP protocol is transmitted to the terminal corresponding to the connection request validated in step 203. According to one particular implementation, the validation brings about the transmission of a SIP INVITE message to the terminal that sent the connection request. Such a message makes it possible for example to establish communication between the terminal 103 and the computer 106, so as to allow the user of the terminal 103 to make a contribution to the conference. With the computer 106 being connected to the sound system of the room, the other participants are able to hear the contribution.

According to one particular embodiment, if the document presented during the conference has been associated with a connection request in step 201, the method according to the invention proposes to automatically display the associated document when the corresponding connection request is validated. The method thus makes it possible to restore the context to what it was at the moment when the participant asked to speak, and avoids the conference leader having to browse through the documents presented in order to again display the document associated with a question that is asked. To this end, a device implementing the invention may consult a database in which the association has been stored in order to obtain for example the name of the file and its location on a storage device, and execute a command to open said file.

When the contribution has ended, the communication is disconnected and, in step 206, a new configuration message is transmitted so as to restore the communication capabilities of the terminals to which a restriction had been applied in step 204. The configuration message is similar, in terms of its form and in terms of the appliance to which is transmitted, to the configuration message transmitted in step 204.

FIG. 4 illustrates, according to one particular embodiment of the invention, a device 400 implementing the method for managing speaking between a first mobile terminal and a second terminal, the first and second terminals being included in a set of terminals that are interconnected through a first communication network.

The device comprises a storage space 401, for example a memory MEM, and a processing unit 403 equipped for example with a processor PROC. The processing unit may be driven by a program 402, for example a computer program PGR, implementing the alert qualification request method as described in the invention with reference to FIG. 4, and in particular the steps of receiving and validating a connection request transmitted by the first terminal, of configuring, for each of the terminals except for the first and second terminals, a first communication restriction for the connections using the first communication network, of establishing communication between the first and the second terminal, and, upon detection of the end of the communication, of removing the communication restriction for all of the terminals.

On startup, the instructions of the computer program 402 are for example loaded into a RAM memory (Random Access Memory in English), before being executed by the processor of the processing unit 403. The processor of the processing unit 403 implements the steps of the method for managing speaking between a first mobile terminal and a second terminal in accordance with the instructions of the computer program 402.

To this end, the device comprises, besides the memory 401, communication means 404 (COM) that allow the device to connect to a telecommunications network and to exchange data with other devices by way of the telecommunications network, and in particular to receive a connection request originating from the first terminal. For example, the communication module may be a WiFi or Ethernet network interface, or else a Bluetooth communication module.

According to one particular implementation, the device furthermore comprises a configuration unit 405 (CONF). This configuration unit makes it possible in particular to order the implementation of a communication restriction for the connections using a particular communication network. This unit may comprise, according to one particular embodiment, a processor designed to determine the minimum bit rate necessary to establish good-quality communication with a terminal, and a network interface designed to transmit a message including configuration parameters to an appliance 409 (FLTR) designed to control the traffic in accordance with management rules. According to one particular implementation of the invention, the component 409 for controlling the traffic is integrated into the device. The management rules make it possible to apply traffic restrictions to a particular terminal when it establishes connections to a network or a particular service. Such a traffic control component may be implemented using software units, such as the open source software IpTables and Netfilter. Such a configuration unit may be implemented by a computer program executed by a processor, or else by an integrated electronic component comprising a circuit designed to drive a traffic control device. According to one particular implementation, the configuration unit is designed to transmit, to at least one terminal, a message containing at least one communication restriction for this at least one terminal when it communicates with a network or a particular service. The configuration module is furthermore designed to order the removal of a communication restriction when communication with a terminal has ended.

The device also comprises, according to one particular implementation, a call management unit 406 (CALL), designed to establish voice or audiovisual communication with a terminal. For example, such a unit may be implemented using a processor executing a call management program in accordance with a voice over IP protocol, such as SIP or H.323 for example. The call management module is connected to a sound system (107) and comprises at least one audio decoder designed to decode an audio stream originating from a terminal, and also an audio interface designed to play back, to the sound system, an analog signal from the decoded digital signal. The connection between the device 400 and the sound system 107 may be direct or formed by way of a wireless connection of Bluetooth type, for example, or by a network connection when the device is implemented on a server.

According to one particular embodiment, the device comprises a processor configured to associate a received connection request with an element displayed on a presentation device, and a memory for storing this association. To this end, the processor executes for example instructions designed to obtain, from the received connection request message, an identifier of said connection request. The processor moreover executes instructions designed to obtain at least one identifier of a document being presented on a display device associated with the device, by using for example APIs of an operating system of the display device. The processor then executes instructions designed to bring about the storage of the identifier of the connection request in association with the at least one identifier of a document being presented, this storage being able for example to be performed in a relational database.

According to one particular embodiment, the device 400 is connected to a display device 407 (DISP), such as a screen or a video projector. The device is thus able to display a list of the received connection requests. To this end, the device may implement a processor configured to execute instructions that make it possible to read connection requests stored in the memory MEM, and to transmit data representative of these connection requests to a user interface management system for display on the device 407.

According to one particular embodiment, the device may be integrated into a terminal of personal computer type that is connected to a sound system, to a desk of a conference room, or else to a remote server designed to manage connection requests in a plurality of conference rooms.

The invention claimed is:

1. A method for managing speaking, between a first terminal and a second terminal, the first terminal and the second terminal being included in a set of a plurality of terminals that are interconnected through a first communication network, the method comprising the following acts implemented by the second terminal:
   receiving and validating a connection request transmitted by the first terminal, the connection request being a request to speak and containing a field including text outlining a purpose of the connection request;
   configuring, for each of the plurality of terminals of the set except for the first terminal and the second terminal, a first communication restriction for connections using the first communication network;
   establishing communication between the first terminal and the second terminal; and upon detection of an end of the communication:
  removing the first communication restriction for all of the plurality of terminals of the set.

2. The method as claimed in claim 1, further comprising configuring, for each of the plurality of terminals of the set except for the first terminal and the second terminal, a second communication restriction that is applied to the connections established to services that are available on a second network that is accessible via an access appliance connected to the first network.

3. The method as claimed in claim 1, further comprising, upon receipt of the connection request originating from the first terminal, associating the connection request with an element displayed on a presentation device.

4. The method as claimed in claim 1, wherein the connection request contains at least one item of data on location of the first terminal.

5. The method as claimed in claim 1, further including, upon the receiving of the connection request, transmitting an acknowledgement of receipt containing at least one order number corresponding to a position of the connection request in a queue of received requests.

6. A device for managing speaking, between a first terminal and a second terminal, the first terminal and the second terminal being included in a set of a plurality of terminals that are interconnected through a first communication network, wherein the device comprises:
  a processor; and
  a non-transitory computer-readable medium comprising instructions stored thereon, which when executed configure the device to:
  receive and validate a connection request transmitted by the first terminal, the connection request being a request to speak and containing a field including text outlining a purpose of the connection request;
  configure, for each of the plurality of terminals of the set except for the first terminal and the second terminal, a first communication restriction that is applied to connections using the first communication network;
  establish communication between the first terminal and the second terminal, and detect an end of the communication, and
  remove the first communication restriction for all of the plurality of terminals of the set upon detection of the end of the communication.

7. The device as claimed in claim 6, wherein the instructions further configure the device to configure, for each of the plurality of terminals of the set except for the first terminal and the second terminal, a second communication restriction that is applied to the connections established to services that are available on a second network that is accessible via an access appliance connected to the first network.

8. The device as claimed in claim 6, instructions further configure the device to:
  associate the received connection request with an element displayed on a presentation device,
  store the association in a memory.

9. The device according to claim 6, wherein the device is implemented in a server for managing quality of communication.

10. The device according to claim 6, wherein the device is implemented in a terminal for managing quality of communication.

11. A non-transitory computer-readable recording carrier on which is stored a computer program comprising instructions for execution of a method for managing speaking, between a first terminal and a second terminal, when the instructions are executed by at least one processor of the second terminal, the first terminal and the second terminal being included in a set of a plurality of terminals that are interconnected through a first communication network, and the instructions configuring the second terminal to:
  receive and validate a connection request transmitted by the first terminal, the connection request being a request to speak and containing a field including text outlining a purpose of the connection request;
  configure, for each of the plurality of terminals of the set except for the first terminal and the second terminal, a first communication restriction for connections using the first communication network;
  establish communication between the first and the second terminals; and
  upon detection of an end of the communication, remove the first communication restriction for all of the plurality of terminals of the set.

* * * * *